Jan. 10, 1961  W. TIRASPOLSKY  2,967,577
TURBINES FOR THE ACTUATION OF DRILLS
Filed Aug. 2, 1957  2 Sheets-Sheet 1

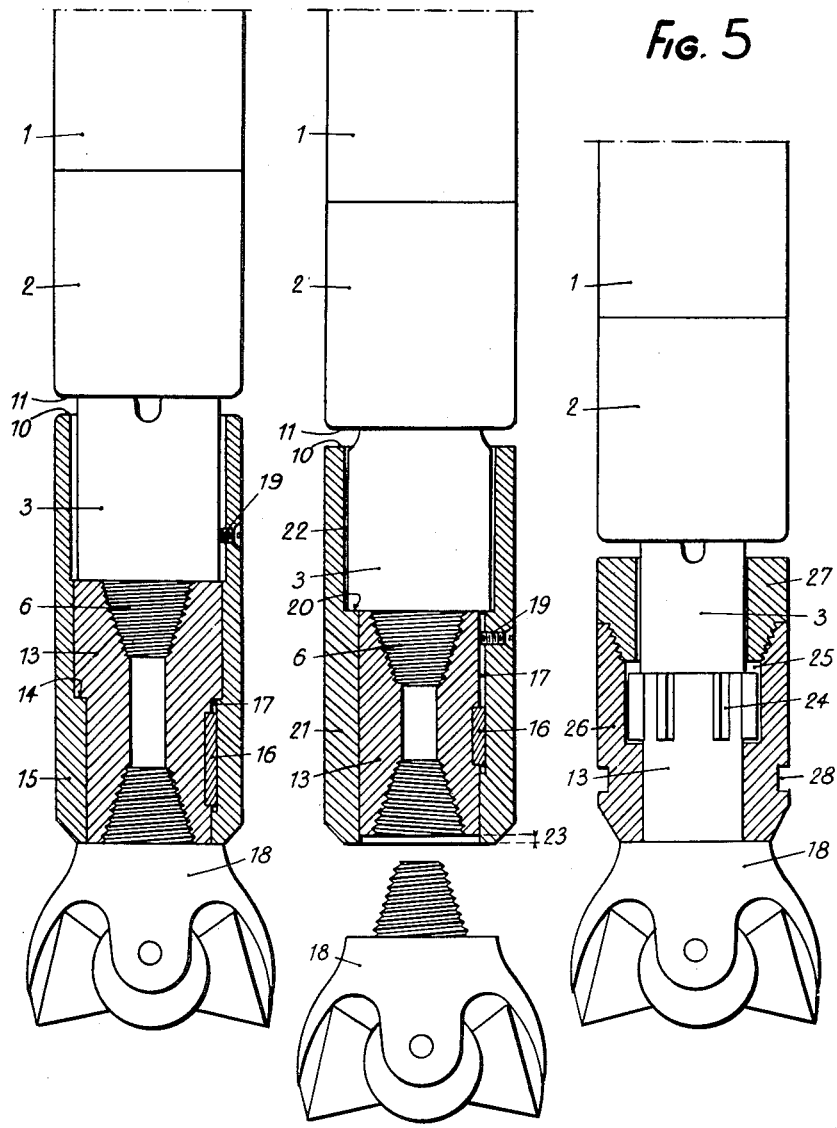

United States Patent Office 2,967,577
Patented Jan. 10, 1961

2,967,577
TURBINES FOR THE ACTUATION OF DRILLS

Wladimir Tiraspolsky, Issy-les-Moulineaux, France
(6 Ave. F. D. Roosevelt, Paris 8, France)

Filed Aug. 2, 1957, Ser. No. 675,968

Claims priority, application France Aug. 4, 1956

6 Claims. (Cl. 175—107)

Most modern turbines used for the actuation of drills, such as those employed in drilling oil fields, have the external shape of cylindrical bodies from the lower end of which a portion of the power shaft which drives the bit projects. The lower part of the turbine body (stator) generally includes a bearing-like sleeve adapted to guide the shaft. Between the turbine shaft and the drilling tool screwed to its lower end is usually interposed a wear-taking joint, the purpose of which is to protect the lower threaded end of the shaft while permitting the same to be adapted, if found necessary, to the threaded portion of the tool where its thread differs from that of the shaft.

This known arrangement presents a number of disadvantages. For example, the reduction of diameter of the turbine at its lower end in front of the shaft is very detrimental to the hydraulic conditions of the flow of the circulating fluid which, after having been led alongside the body of the bit, forms a vortext in a wider annular space defined between the shaft and the well wall, whereafter said flow is suddenly throttled as the fluid meets the turbine body. The small gap which generally subsists between the shaft and the bearing is open downwardly, thereby permitting extraneous bodies or impurities such as cuttings in suspension in the circulating fluid or rock fragments from the well wall to find their way into the bearing. Moreover, the measurement of the degree of axial wear of the thrust-taking elements as generally provided in the utrbine is toilsome and calls for skilled labor because it has to be done between indices on the shaft and on the lower edge of the bearing sleeve or on the body of the turbine. As said lower edge is subjected to wear and thus becomes rounded off, it does not constitute a satisfactory reference surface.

An object of the invention is to remedy these disadvantages and to provide a turbine for the actuation of a well-boring drill capable of solving the aforesaid technical problems, particularly as regards the vortical flow of the circulating fluid, the ingress of extraneous bodies into the lower bearing and the measurement of the degree of axial wear of the bearings.

Another object of the invention is to provide a turbine for the actuation of well-boring drills including a compensating sleeve having a threaded portion matching the lower threaded portion of the turbine shaft and a tool-receiving threaded portion, said sleeve surrounding substantially the entire lower end of the shaft and having an outer diameter at least substantially equal to the outer diameter of the turbine body of casing.

A further object of the invention is to provide, in one embodiment, a turbine in which the compensating sleeve is screwed up and eventually shrunk upon the shaft, preferably adjacent its upper edge so as to provide a perfect joint.

Still a further object of the invention is to provide a turbine in which a compensating sleeve surrounding the lower projecting part of the turbine shaft increases the moment of inertia of the rotating parts and the stability of the turbine during the drilling operation.

In one aspect of the invention, the upper edge surface of the compensating sleeve is flat and disposed closely spaced from and generally parallel to the flat lower edge surface of the lower bearing sleeve mounted upon the turbine body. The small gap which is thus defined between the two radially extending flat surfaces cannot cause a vortical flow of the circulating fluid which is allowed an even flow through the annular space of even cross section defined between the well wall and the compensating sleeve or the turbine body. This axial gap defined between the two flat surfaces may be used for achieving a swift and easy measurement of the axial clearance, for example by means of a wedge or shim adapted to provide the permissible maximum and minimum thicknesses in both positions of the turbine, namely in the suspended position and in the abutted position.

In another aspect of the invention, there is provided on the periphery of the bearing sleeve and in its lower portion a curved row of apertures for the outflow of that portion of the circulating fluid which passes through the lower bearing, said apertures being so located as to ensure an ejection and a minimum vortex in the rising fluid stream which is led along the turbine body.

The compensating sleeve may be in one part or made up of several parts. Thus the lower end portion of the shaft of the turbine or subterranean engine may preserve the usual wear-taking joint provided it is so altered as to receive a compensating sleeve adapted to do away with the diameter reduction as previously indicated, the upper end portion of said compensating sleeve surrounding the projecting portion of the shaft. This compensating sleeve may be slidably engaged over the projecting portion of the shaft or alternatively may be keyed thereto or secured to said shaft portion by any other approved means. An abutment element is then preferably provided for preventing the compensating sleeve from falling down when the tool is being dismantled.

Shoulders or clearances may be provided on the sleeve, on the end union of the shaft or on the shaft itself for facilitating assembling and disassembling or for giving the entire device a better behavior during its operation. Use may be made for assembling and dismantling the parts of the known mechanical, hydraulic, thermal or other blocking, locking or releasing methods. Shoulders may be provided if necessary outside the sleeve for facilitating its extraction by means of a tool of the hub puller type, for example if the sleeve happens to be wedged on the shaft.

In one embodiment the sleeve forms with the lower joint or union and even with the lower end of the shaft an axially prestressed assembly which may be eventually radially shrunk, thereby permitting the mechanical strength of this part of the device to be considerably enhanced toward mechanical strains to which it is subjected during operation. The joint or union may have for example such a diameter as to provide on the lower end of the shaft a shoulder against which a companion shoulder on the compensating sleeve may be abutted, said sleeve being thus compressed as the tool is screwed up while the corresponding zones of the union and shaft are placed in tension.

For an easier understanding of the invention, reference will now be made to the accompanying drawings wherein:

Fig. 3 is a diagrammatic vertical sectional view of the lower portion of a drilling turbine equipped with a compensating sleeve embodying a constructional variation of the subject matter of the invention.

Figs. 4 and 5 are views similar to Fig. 3 relating to further constructional modifications.

Figure 1:
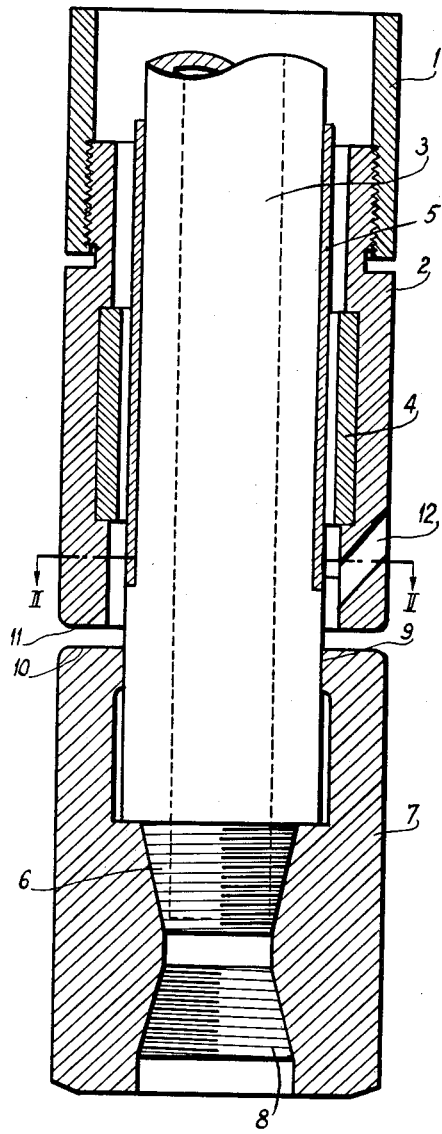
Fig. 1 is a diagrammatic vertical sectional view of the lower portion of a turbine for the actuation of a well-boring drill fitted with a wear-compensating sleeve according to the invention.
Figure 2:
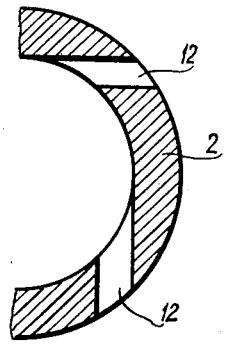
Fig. 2 is a half sectional view on the line II—II of Fig. 1.

The turbine which is partly represented in Fig. 1 comprises as usual a body or casing 1 having a downward extension 2 forming a bearing sleeve through which the turbine shaft 3 is revolubly supported, a bushing 4 (for example a rubber-coated bushing) and a wear-taking sleeve 5 being provided. The turbine shaft 3 projects downwardly from the bearing sleeve 2 and is provided, according to the invention, on its threaded portion 6 with a diameter compensating sleeve 7 having a further threaded portion 8 for receiving a tool (not shown). Said sleeve 7 encompasses the lower end of the shaft 3 to which it may be for example shrunk as shown at 9, thereby ensuring a perfect junction with said shaft.

The outer diameter of the diameter-compensating sleeve 7 is equal to the outer diameter of the turbine body 1 and bearing sleeve 2 so that the rising flow of the circulating fluid takes place regularly and evenly inside the annular space provided between the well wall and the periphery of the sleeve 7 and turbine body.

The upper edge surface 10 of the diameter-compensating sleeve 7 and the lower edge surface 11 of the bearing sleeve 2 provide (as represented) radially extending plane surfaces arranged to oppose each other. The narrow gap defined between said radial surfaces is insufficient for causing a vortical flow of the circulating fluid. However their spacing in the extreme positions, that is to say respectively when the turbine is suspended and when it is abutted, permits a swift and easy supervision of the axial wear by means of a maximum and minimum check wedge or shim. It is only necessary for the operator to verify whether the width of the gap is actually comprised between the permissible limit values i.e. whether the wedge may be inserted on one side into the gap while not being insertable thereinto by its other side for measuring whether the axial wear of the abuments is not unduly large either when the turbine is in suspended or in abutted position.

In order to facilitate an even outflow of that portion of the circulating fluid which flows through the bearing 4—3, there is provided in the lower neck portion of the bearing sleeve 2 a series of apertures 12 extending tangentially and upwardly (as shown) so as to lessen the vortex caused by the rising fluid stream moving through the annular space defined between said sleeve and the well wall.

It will be noticed that the peripheral surface of the diameter-compensating sleeve 7 need not be cylindrical as shown. It may be extended in tapering fashion either upwardly or downwardly for facilitating proper junction with the subjacent tool or for generating special hydraulic conditions matching the junction with the turbine body.

In the showing of Fig. 3, the reference numeral 1 designates as before the body of the drilling turbine which extends downwardly and forms a lower sleeve 2 from which projects a shaft assembly including the lower end of shaft 3 and a wear-taking joint 13. The threaded portion 6 of said shaft receives in this constructional form wear-taking joint 13 provided with a shoulder 14. This wear-taking joint 13 is surrounded by a compensating sleeve 15 made fast for joint angular motion upon the wear-taking joint 13 by means of a key 16 housed in a groove 17. The upper end portion of the compensating sleeve surrounds substantially the entire projecting lower end portion of the shaft 3 while leaving between them a small clearance. The compensating sleeve 15 is held in position by a shoulder on the tool 18 which is screwed into the wear-taking joint 13, dropping thereof being precluded, when the tool is dismantled, by a holding tenon or plug 19. The axial wear may be controlled or gaged as previously described between the oppositely located faces 10 and 11 of the lower sleeve 2 and the compensating sleeve 15.

In the constructional form shown in Fig. 4, the diameter of the wear-taking joint 13 is so bounded as to provide a shoulder 20 at the lower end portion of the shaft 3. Here again the compensating sleeve 21 is made fast for joint angular motion upon the wear-taking joint 13 by a key 16 housed in a groove 17, dropping thereof being prevented by a holding tenon 19. However, in this case, the upper end portion of the compensating sleeve 21 has a slight clearance as shown at 22, and its length defined between its lower end face and the shoulder 20 is slightly larger than the height of the wear-taking joint 13. There is thus obtained in the inoperative condition a certain amount of pressing clearance 23 between the end faces of the two sleeves. When the tool is screwed home, said end faces are brought into flushed condition which will cause the compensating sleeve 21 to be subjected to compression, while the wear-taking joint 13 is subjected to tension. The pressing as thus achieved increases the mechanical strength of the entire assembly.

According to the constructional modification shown in Fig. 5, the wear-taking joint 13 has flutes 24 the intermediate edges of which are received in grooves 25. The compensating sleeve is made up of two parts and includes a part 26 forming the sleeve proper and a nut 27 of equal diameter having a left-handed threaded portion. The nut 27 holds the sleeve 26 and prevents it from dropping as the tool 18 is unscrewed. A groove 28 is provided on the sleeve 26 for receiving an extractor more or less similar to a hub puller which may be abutted against the wear-taking joint 13.

Minor constructional details may be varied without departing from the scope of the subjoined claims.

What is claimed is:

1. In a motor actuated by a circulating fluid for subterranean work including a body, a shaft of reduced diameter projecting from the lower end of said body and ending in a threaded portion, a threaded wear-taking joint screwed to said shaft, and a tool having a threaded end portion screwed into said joint: a diameter-reduction compensating sleeve surrounding and carried by said wear-taking joint, said sleeve extending upwardly from said joint to surround substantially the entire projecting end of said shaft, having a diameter substantially equal to that of the motor body, and being axially spaced from said motor body, a downwardly facing primary shoulder on said shaft, an upwardly facing secondary shoulder inside said sleeve opposing said primary shoulder, the distance between said primary shoulder and the lower end of said wear-taking joint being smaller than the distance between said secondary shoulder and the lower end of said sleeve so that screwing the tool into operative position on said joint prestresses said joint and the corresponding portion of the sleeve, and means for holding said compensating sleeve on said joint after the removal of said tool.

2. A motor for subterranean work according to claim 1, having a primary flat reference surface on the lower end of said motor body, a secondary flat reference surface on the upper end of said sleeve spaced from and opposing said primary reference surface, key means connecting said joint and said sleeve, and included in said means for holding said compensating sleeve on said joint a holding plug extending transversely from said sleeve interior, and a tertiary abutment shoulder on said joint aligned with and beneath said plug and provided by said key means, said tertiary shoulder being adapted to engage said plug to prevent the sleeve from dropping off the joint when said tool is unscrewed.

3. In a motor actuated by a circulating fluid for subterranean work such as a soil-drilling turbine including a body, a shaft of reduced diameter projecting from the lower end of said body and ending in a threaded portion, a threaded wear-taking joint screwed to said shaft, and a tool having a threaded end portion screwed into said joint: a diameter-reduction compensating sleeve surrounding and carried by said wear-taking joint, said sleeve extending upwardly from said joint to surround the lower end portion of said shaft, a threaded portion on the upper end of said sleeve, a holding nut screwed into said threaded portion and surrounding the projecting portion of said shaft, said sleeve and nut surrounding substantially the entire projecting end of said shaft and having equal outer diameters which are substantially the same as the outer diameter of the motor body, said nut being axially spaced from said motor body, vertical grooves in the inner face of said sleeve, said grooves opening on the upper end of said sleeve, and vertical holding ribs on said wear-taking joint to engage said grooves, said nut engaging said ribs when said tool is removed to hold said sleeve in said joint.

4. A motor for subterranean work according to claim 3, including a primary flat reference surface on the lower end of said motor body, and a secondary flat reference surface on the upper end of said nut spaced from and opposing said primary reference surface, variation of the distance between said reference surfaces permitting the axial wear of the motor parts to be measured.

5. In a well-drilling turbine comprising a body, a shaft assembly including a wear-taking joint and a shaft of reduced diameter projecting from the lower end of said body, said shaft ending in a threaded portion to which said wear-taking joint is screwed, and a tool having a threaded end portion screwed into said joint: a diameter-reduction compensating sleeve surrounding and carried by said wear-taking joint, said sleeve extending upwardly from said joint to surround substantially the entire projecting end of said shaft and having a diameter substantially equal to that of the turbine body, a primary reference surface on the lower end of said body, a secondary reference surface on the upper end of said compensating sleeve spaced from and opposing said primary reference surface, primary holding means provided on said tool for retaining said compensating sleeve in assembled relation with wear-taking joint, abutment means between said shaft assembly and said compensating sleeve adapted to longitudinally position said sleeve relative to said shaft assembly and secondary holding means provided on said sleeve for retaining said sleeve on said joint after the removal of said tool.

6. In a well-drilling turbine including a body, a shaft of reduced diameter projecting from the lower end of said body and ending in a threaded portion, a wear-taking joint screwed to said shaft, and a tool having a threaded end portion screwed into said joint: a diameter-reduction compensating sleeve surrounding and carried by said wear-taking joint, said sleeve extending upwardly from said joint to surround substantially the entire projecting end of said shaft and having a diameter substantially equal to that of the turbine body, a primary reference surface on the lower end of said body, a secondary reference surface on the upper end of said compensating sleeve axially spaced from and opposing said primary reference surface, a downwardly facing primary abutment shoulder on said wear-taking joint, an upwardly facing secondary abutment shoulder inside said compensating sleeve opposing said primary shoulder, said secondary shoulder being held against said primary shoulder by screwed engagement of said tool and said joint, key means interconnecting said wear-taking joint and said compensating sleeve, a holding plug extending transversely from the interior of said sleeve, and an upwardly facing tertiary shoulder on said joint beneath said plug providing an abutment for said plug to engage to prevent release of said sleeve from said joint when said tool is unscrewed.

References Cited in the file of this patent

UNITED STATES PATENTS

| | | |
|---|---|---|
| 460,369 | Canan | Sept. 29, 1891 |
| 1,030,387 | Critton | June 25, 1912 |
| 2,340,738 | Dilley | Feb. 1, 1944 |
| 2,717,762 | McGregor | Sept. 13, 1955 |
| 2,783,971 | Carle et al. | Mar. 5, 1957 |
| 2,801,079 | Gress | July 30, 1957 |